(12) United States Patent
Yamamoto

(10) Patent No.: US 8,228,608 B2
(45) Date of Patent: Jul. 24, 2012

(54) DISPLAY APPARATUS, DISPLAY METHOD, GOGGLE-TYPE HEAD-MOUNTED DISPLAY, AND VEHICLE

(75) Inventor: Kakuya Yamamoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/107,076

(22) Filed: May 13, 2011

(65) Prior Publication Data

US 2011/0211260 A1  Sep. 1, 2011

Related U.S. Application Data

(62) Division of application No. 12/401,016, filed on Mar. 10, 2009, now abandoned.

(30) Foreign Application Priority Data

Mar. 11, 2008  (JP) ................................. 2008-060654

(51) Int. Cl.
  *G02B 27/14* (2006.01)
  *G02B 13/14* (2006.01)
  *G09G 5/00* (2006.01)
  *A61B 3/14* (2006.01)

(52) U.S. Cl. ............. 359/630; 359/359; 345/7; 351/209

(58) Field of Classification Search .......... 359/630–633, 359/359

See application file for complete search history.

(56) References Cited

U.S. PATENT DOCUMENTS

| | | | |
|---|---|---|---|
| 5,355,181 A | 10/1994 | Ashizaki et al. | |
| 5,508,759 A | 4/1996 | Konishi et al. | |
| 6,097,353 A * | 8/2000 | Melville et al. | 345/8 |
| 6,203,639 B1 | 3/2001 | Swanson et al. | |
| 6,388,814 B2 * | 5/2002 | Tanaka | 359/630 |
| 7,145,726 B2 | 12/2006 | Geist | |
| 7,230,767 B2 | 6/2007 | Walck et al. | |
| 7,663,805 B2 * | 2/2010 | Zaloum et al. | 359/630 |
| 2010/0045571 A1 * | 2/2010 | Yamamoto | 345/8 |
| 2010/0060551 A1 * | 3/2010 | Sugiyama et al. | 345/8 |
| 2010/0097580 A1 * | 4/2010 | Yamamoto et al. | 353/69 |
| 2010/0103077 A1 * | 4/2010 | Sugiyama et al. | 345/8 |
| 2011/0102874 A1 * | 5/2011 | Sugiyama et al. | 359/205.1 |

FOREIGN PATENT DOCUMENTS

| | | |
|---|---|---|
| JP | 4-65648 | 6/1992 |
| JP | 2908696 | 6/1999 |
| JP | 2932636 | 8/1999 |
| JP | 2995876 | 12/1999 |
| JP | 2000-143842 | 5/2000 |
| JP | 3425818 | 7/2003 |

* cited by examiner

*Primary Examiner* — Ricky Mack
*Assistant Examiner* — Zachary Wilkes
(74) *Attorney, Agent, or Firm* — Wenderoth, Lind & Ponack, L.L.P.

(57) ABSTRACT

A display apparatus includes a light source which emits a beam including visible light forming an image and infrared rays, and a transmissive deflection unit including a first surface facing the eyes of a user and a second surface which is a rear surface of the first surface. The transmissive deflection unit has transmissive characteristics for transmitting the visible light from the second surface side to the first surface side, deflection characteristics for deflecting, toward the eyes of the user, the visible light projected from the light source to the first surface side, and infrared absorption characteristics for absorbing the infrared rays projected from the light source to the first surface side.

14 Claims, 6 Drawing Sheets

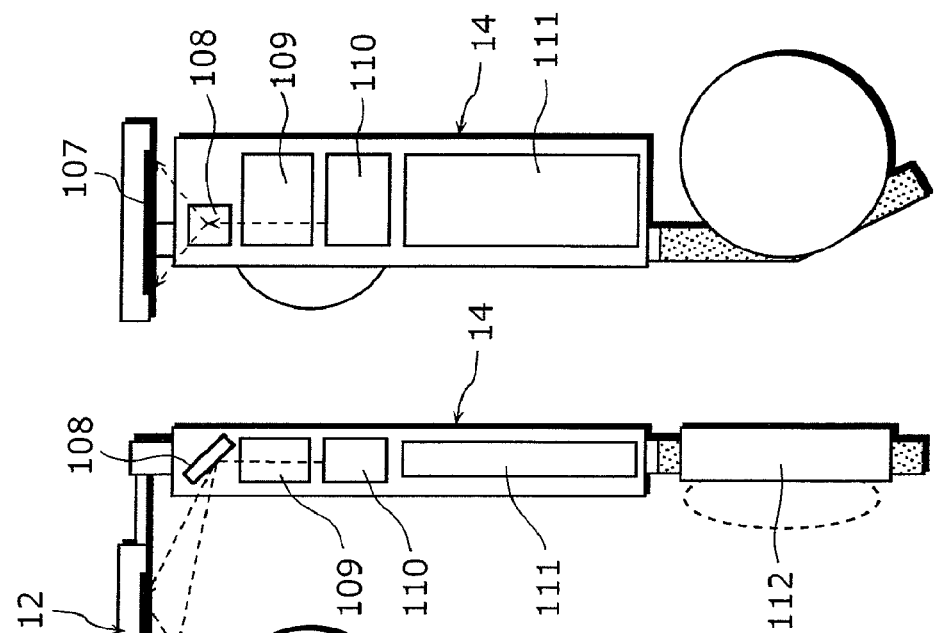
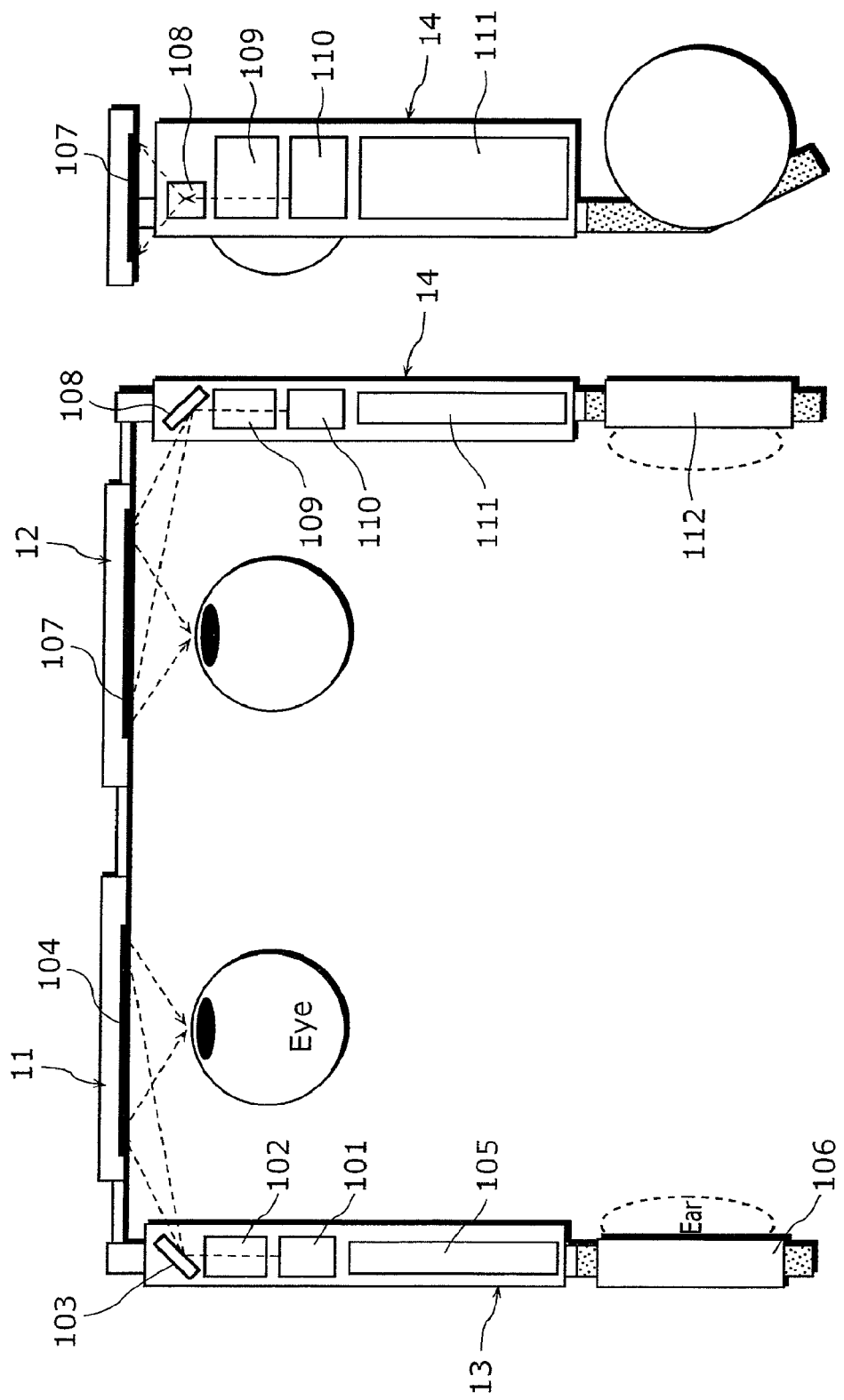

DISPLAY APPARATUS, DISPLAY METHOD, GOGGLE-TYPE HEAD-MOUNTED DISPLAY, AND VEHICLE

This application is a divisional of application Ser. No. 12/401,016, filed Mar. 10, 2009 now abandoned.

BACKGROUND OF THE INVENTION (1) Field of the Invention

The present invention relates to apparatuses which perform scanning using laser beams, and particularly to a display apparatus such as a head-up display (HUD) and a head-mounted display (HMD).

(2) Description of the Related Art

Conventional methods used for display apparatuses such as a head-mounted display (HMD) and a head-up display (HUD) include a method for performing direct drawing on the retinas of the eyes of a user by performing two-dimensional scanning using a laser beam (hereinafter, described as a laser-scanning method) (for example, see Japanese Patent No. 2932636.) The display apparatus according to the laser scanning method is also known as a: retinal scanning display (RSD), retinal irradiation display, retinal direct-draw display, laser scanning display, direct-view-type display, virtual retinal display (VRD), and so on.

In general, in the HMD or HUD according to the laser scanning method, a scan unit performs two-dimensional scanning using a laser beam emitted from a laser light source, and a deflection unit, such as a lens or a mirror, provided in front of the eyes of the user deflects the beam toward the pupils. Then the beam passed through the pupils forms an image on the retinas.

Since the deflection unit is provided in front of the eyes of the user, there is a problem in that the user's breathing or sweating cause condensation on the surface of the deflection unit, resulting in fogging on the deflection unit. The fogging on the deflection unit decreases efficiency and precision of deflecting the beam projected by the scan unit toward the pupils of the user. As a result, a problem of image degradation occurs. Further, in the case where the deflection unit transmits visible light, such a problem occurs where transmittance is decreased and viewing external world becomes difficult.

Examples of common measures to remove fogging include a method which uses an infrared heater (for example, see Japanese Unexamined Utility Model Application Publication No. 4-65648) and a method in which a heat conductive layer is formed on the rear surface of a mirror (for example, see Japanese Patent No. 2908696). There is also a method which uses a transparent resin which absorbs infrared rays to reduce fogging (for example, see Japanese Unexamined Patent Application Publication No. 2000-143842).

Furthermore, examples of methods for detecting a line-of-sight includes a method in which infrared rays are projected onto the eyes and the reflected light is used for the line-of-sight detection (for example, see Japanese Patent No. 2995876), and a method in which a light, reflected from the eyes, of a laser beam projected for scanning, is used for the line-of-sight detection (for example, see Japanese Patent No. 3425818).

However, in the method using the infrared heater and the like as in Japanese Unexamined Utility Model Application Publication No. 4-65648, an infrared heater and the like is necessary in addition to the light source and the scan unit for displaying an image. Consequently, such problems occur that the total volume and weight of the HMD and HUD increase or component cost increases.

SUMMARY OF THE INVENTION

The present invention is conceived for solving the problems described above, and it is an objective of the present invention to obtain a display apparatus, such as a HMD and HUD, which can reduce, remove and prevent fogging that occurs on a deflection unit in front of the eyes of a user without addition of an apparatus dedicated for preventing and removing fogging such as a heater and a blower, while suppressing the increase in the volume, weight, and component cost of the apparatus as a whole.

The display apparatus according to the present invention displays an image on the retinas of the user. More specifically, the display apparatus includes: a light source which emits a beam including a visible light forming the image and an infrared ray; and a transmissive deflection unit which includes a first surface facing an eye of the user, and a second surface that is a rear surface of the first surface. The transmissive deflection unit has: a transmissive characteristic for transmitting the visible light from a second surface side to a first surface side; a deflection characteristic for deflecting, toward the eye of the user, the visible light projected from the light source to the first surface side; and an infrared absorption characteristic for absorbing the infrared ray projected from the light source to the first surface side.

This structure provides, in the display apparatus such as a HMD and HUD, an advantageous effect of reducing, removing and preventing fogging that occurs on the transmissive deflection unit in front of the eyes without addition of an apparatus dedicated for preventing and removing fogging such as a heater and a blower, while suppressing the increase in the volume, weight, and component cost of the apparatus as a whole. This structure also makes it possible to take a fogging prevention measure and display images at the same time.

Further, the display apparatus may include a scan unit which performs two-dimensional scanning on the first surface of the transmissive deflection unit, using the beam emitted from the light source; and a control unit which causes said light source to change an output intensity of the infrared ray according to a position on the first surface onto which the beam is projected for scanning by the scan unit. With this structure, the infrared rays can be concentrated on a necessary area only; therefore, such advantageous effects can be obtained where energy consumption efficiency of the infrared rays is enhanced, and temperature rise of the light source is suppressed, allowing extension of the life of the light source.

Further, the control unit may cause the light source to increase the output intensity of the infrared ray as a position onto which the beam is projected for scanning by the scan unit becomes closer to a central part of the first surface. This structure provides an advantageous effect of preferentially reducing the fogging on the central part of the transmissive deflection unit, where the line-of-sight is concentrated most.

Further, the display apparatus includes a light detecting unit which detects a reflected light intensity, on the transmissive deflection unit, of the beam projected for scanning by the scan unit. The control unit may cause the light source to change the output intensity of the infrared ray according to a change of the reflected light intensity detected by the light detecting unit.

This structure provides an advantageous effect of reducing the fogging efficiently in the case where the presence or level of the fogging differs depending on the part of the transmissive deflection unit. In addition, it is also possible to suppress the temperature rise of the light source, which allows extension of the life of the light source.

Further, the display apparatus includes a line-of-sight detecting unit which detects a line-of-sight of the user based on a reflected light, on the eye of the user, of the visible beam deflected by the transmissive deflection unit. The control unit may cause the light source to increase the output intensity of the infrared ray as a position onto which the beam is projected for scanning by the scan unit becomes closer to a position where the line-of-sight of the user detected by the line-of-sight detecting unit and the first surface intersect with each other. This structure provides an advantageous effect of preferentially reducing the fogging on the part where the user is gazing at. In addition, it is also possible to suppress the temperature rise of the light source, which allows extension of the life of the light source.

Further, the transmissive deflection unit may include: an infrared absorption layer which is disposed on the first surface side, transmits the visible light, and absorbs the infrared ray emitted from the light source; a visible light deflection layer which is disposed on the second surface side, transmits the visible light traveling from the second surface side to the first surface side, and deflects, toward the eye of the user, the visible light emitted from the light source; and a heat insulation layer which is disposed between the infrared absorption layer and the visible light deflection layer, transmits the visible light, and blocks heat propagation between the infrared absorption layer and the visible light deflection layer.

With this structure, it is possible to reduce the temperature change of the visible light deflection layer even when the temperature of the infrared absorption layer rises. As a result, such effects can be obtained where the characteristic change of the visible light deflection layer, such as decrease or degradation of the deflection factor, due to the temperature change can be reduced. Further, the temperature of the infrared absorption layer can be efficiently raised; and thus, prevention and reduction of condensation is possible with less laser output.

Further, the infrared absorption layer may have a different infrared absorptance according to a position on the first surface. This structure provides an advantageous effect of reducing unnecessary removal of the fogging, and decreasing the area of the infrared absorption layer, which contributes the cost reduction.

More particularly, the infrared absorption layer may have a higher infrared absorptance as a position on the first surface becomes closer to the central part of the first surface. This structure provides an advantageous effect of preferentially reducing the fogging on the central part, of the transmissive deflection unit, where the line-of-sight is concentrated most.

Further, the scan unit and the transmissive deflection unit may be positioned such that the infrared ray specularly reflected by the transmissive deflection unit is projected onto a position that is different from a position of the eye of the user. With this structure, it is possible to reduce the amount of infrared rays entering the eyes of the user even when the specular reflectance of the beam on the transmissive deflection unit is high. As a result, influences of the infrared rays on the eyes can be reduced. In addition, it is possible to increase the amount of infrared rays projected onto the transmissive deflection unit without increasing the influences on the eyes; and thus condensation can be further reduced.

Further, the display apparatus may include: an electric power supply mode switching unit which switches between a first electric power supply mode in which an electric power from an external power source is supplied to the light source, and a second electric power supply mode in which an electric power from a battery included in the display apparatus is supplied to the light source; and a control unit which causes the light source to decrease the output intensity of the infrared ray in response to the switching into the second electric power supply mode by the electric power supply mode switching unit. With this structure, fogging can be strongly reduced when there are plenty of electric power. Even when there is not enough surplus electric power, the fogging can be appropriately reduced.

Further, the display apparatus may include a control unit which makes a wavefront shape of the infrared ray emitted from the light source different from a wavefront shape of the visible light, so that a focal position of the infrared ray that is deflected by said transmissive deflection unit toward the eye of the user is a position that is out of the eye of the user. With this structure, the infrared rays are not focused on the user's eyes; therefore, the influences of the infrared rays on the eyes can be reduced even when a part of the infrared rays enters the user's eyes. In addition, it is also possible to increase the amount of infrared rays projected onto the transmissive deflection unit without increasing the influences on the eyes; and thus condensation can be further reduced.

The display method according to the present invention displays an image on a retina of a user via a transmissive deflection unit. The transmissive deflection unit includes: a first surface facing an eye of the user, and a second surface that is a rear surface of the first surface; a transmissive characteristic for transmitting a visible light from a second surface side to a first surface side; a deflection characteristic for deflecting, toward the eye of the user, the visible light projected from a light source to the first surface side; and an infrared absorption characteristic for absorbing an infrared ray projected from the light source to the first surface side. More specifically, the display method includes: emitting a beam including the visible light forming the image and the infrared ray; performing two-dimensional scanning on the first surface of the transmissive deflection unit, using the beam emitted in the emitting; and changing an output intensity of the infrared beam in the emitting according to a position on the first surface onto which the beam is projected for scanning in the scanning.

Note that the present invention can be implemented not only as a display apparatus as described above, but also as an integrated circuit which implements the functions of the display apparatus, and as a program causing a computer to execute such functions. As a matter of course, such a program can be distributed through a recording medium such as a CD-ROM and a transmission medium such as the Internet. In addition, the present invention can also be implemented as an integrated circuit which implements the functions of such a display apparatus.

The goggle-type head-mounted display according to the present invention includes the display apparatus; a pair of lenses provided in front of the eyes of the user and each having the transmissive deflection unit on a side facing the eyes of the user; and a pair of temples each having one end connected to corresponding one of the pair of lenses and the other end fixed to a lateral side of a head of the user.

The vehicle according to the present invention includes the display apparatus and a windshield having the transmissive deflection unit.

FURTHER INFORMATION ABOUT TECHNICAL BACKGROUND TO THIS APPLICATION

The disclosure of Japanese Patent Application No. 2008-060654 filed on Mar. 11, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1A is a plan view of a display apparatus in Embodiment 1 according to the present invention.

FIG. 1B is a side view of the display apparatus in Embodiment 1 according to the present invention.

DESCRIPTION OF THE PREFERRED EMBODIMENTS

Hereinafter, embodiments of the present invention shall be described with reference to the drawings.

Embodiment 1

Figure 2:
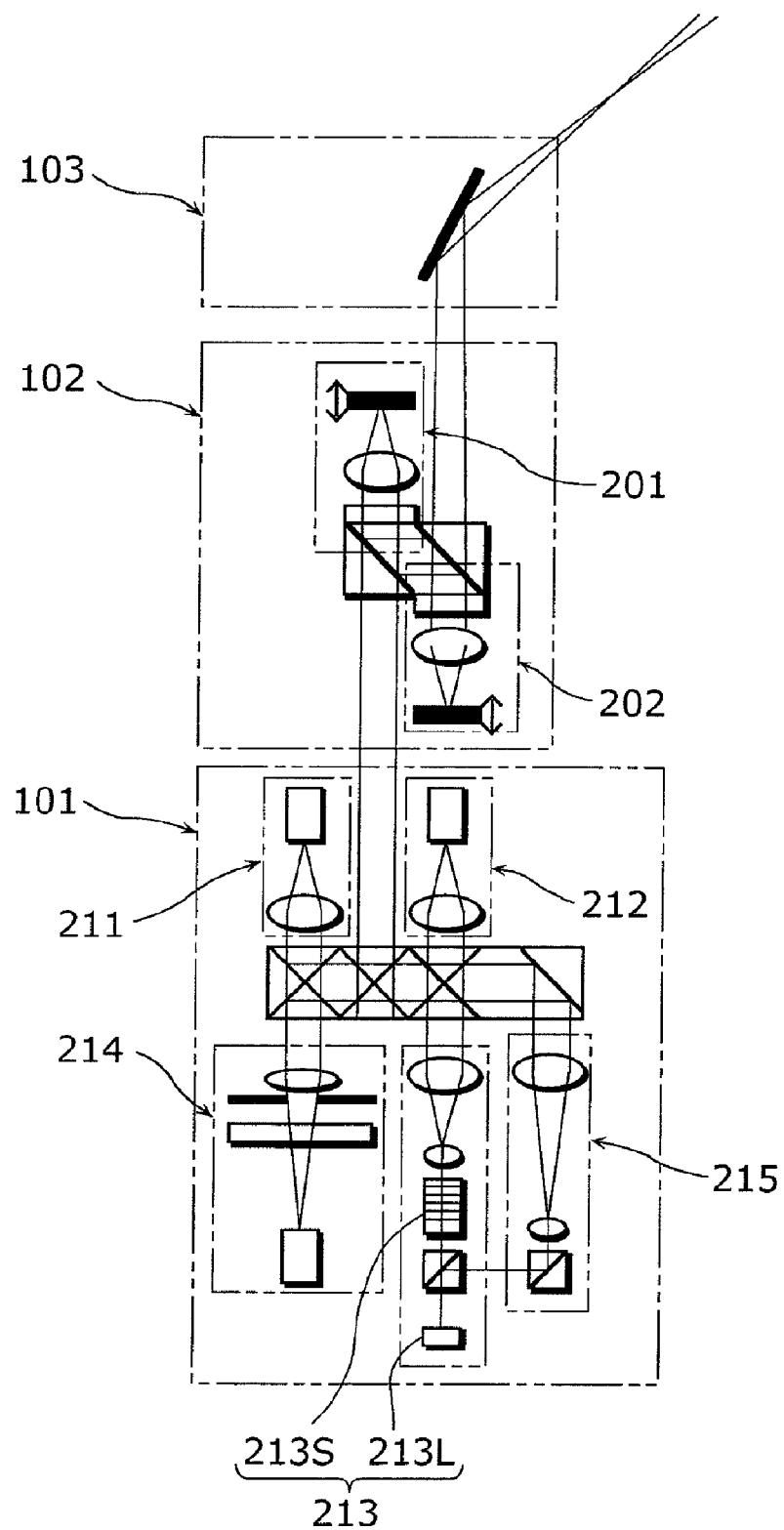
FIG. 2 is a diagram showing a detailed structure of the display apparatus in Embodiment 1 according to the present invention.
Figure 3:
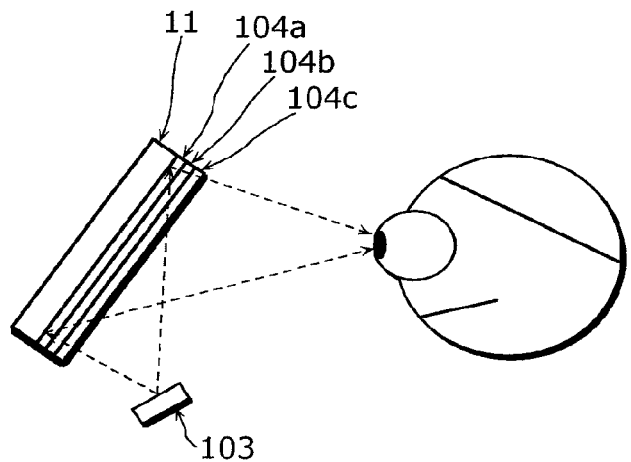
FIG. 3 is a diagram showing a structure of a transmissive deflection unit.
Figure 4:
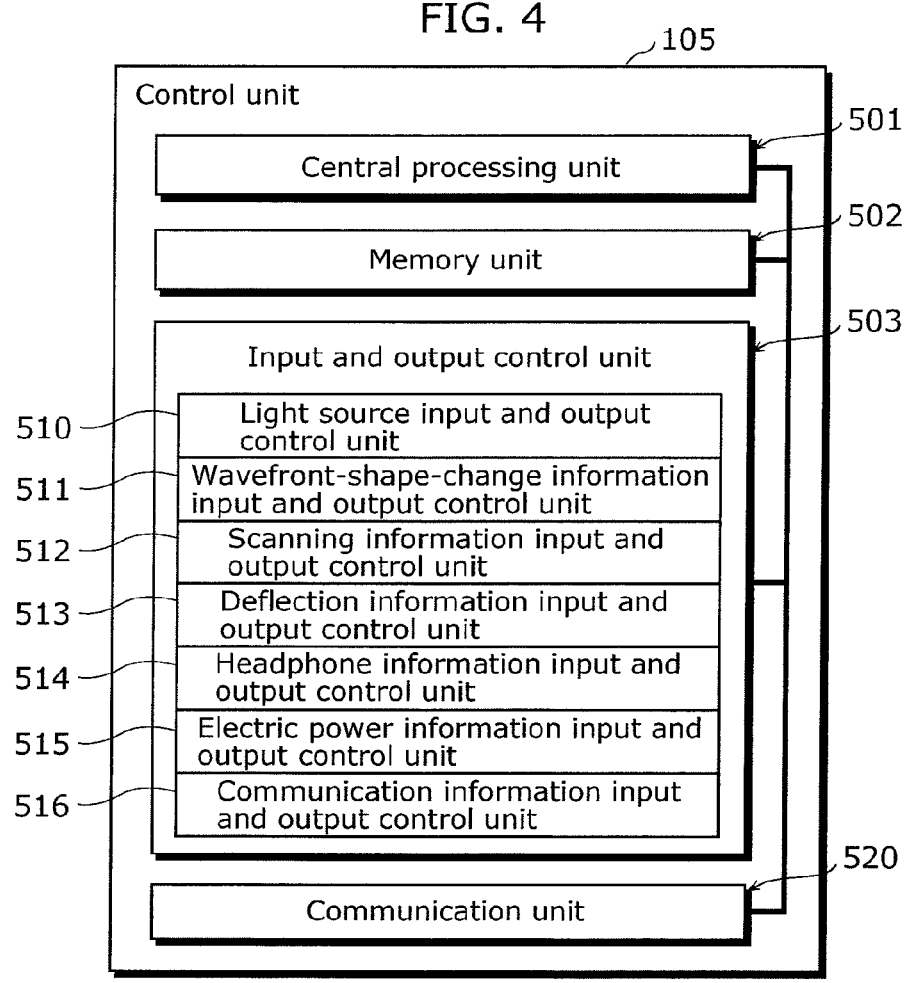
FIG. 4 is a functional block diagram of a control unit.

With reference to FIGS. 1A to 4, a goggle-type head-mounted display (HMD) that is a display apparatus in Embodiment 1 according to the present invention shall be described. Note that: FIG. 1A is a plan view of the goggle-type HMD; FIG. 1B is a side view of the goggle-type HMD; FIG. 2 is a detailed view of a portion of FIG. 1A; FIG. 3 is a diagram showing an example of a specific structure of a transmissive deflection unit; and FIG. 4 is a functional block diagram of the goggle-type HMD.

The goggle-type HMD according to Embodiment 1 of the present invention includes: a display apparatus, a pair of lenses 11 and 12 provided in front of the user's eyes, and a pair of temples 13 and 14 each having one end connected to a corresponding one of the lenses 11 and 12 and the other end fixed to each lateral side of the user's head.

As shown in FIGS. 1A, 1B, and 2, the display apparatus includes: light sources 101 and 110; wavefront shape changing units 102 and 109; scan units 103 and 108, transmissive deflection units 104 and 107, control units 105 and 111, and headphone units 106 and 112.

Note that in this embodiment, the temples 13 and 14 hold the light sources 101 and 110, the wavefront shape changing units 102 and 109, the scan units 103 and 108, the control units 105 and 111, and the headphone units 106 and 112, with the transmissive deflection units 104 and 107 being provided on the lenses 11 and 12 respectively at a side facing the user's eyes.

Hereinafter, each element of the goggle-type HMD shall be described in detail. Since each element provided respectively at the left side and the right side of the user is common, the description is given below of the light source 101, the wavefront shape changing unit 102, the scan unit 103, the transmissive deflection unit 104, the control unit 105 and the headphone unit 106, which are provided at the left side of the user.

The light source 101 emits a beam including visible light forming an image and infrared rays. As shown in FIG. 2, the visible light is a laser light obtained by synthesizing laser lights emitted from a red laser light source 211, a blue laser light source 212, and a green laser light source 213. A proper modulation of the outputs from the respective laser light sources 211, 212, and 213 makes it possible to emit a laser light having an arbitrary color. Furthermore, modulation implemented by causing a later-described wavefront shape changing unit 102 and scan unit 103 to cooperate with each other makes it possible to form an image on the retina of the user's eye. On the other hand, the infrared rays are emitted from an infrared laser light source 215.

Note that the green laser light source 213 in the present embodiment emits a green laser by combining a semiconductor laser light source 213L that emits infrared rays and a second-harmonic generation (SHG) element 213S that converts the infrared rays into green light. In addition, the infrared laser light source 215 includes a half mirror (optical branching unit) that branches a part of the infrared rays emitted from the semiconductor laser light source 213L included in the green laser light source 213. In other words, the green laser light source 213 and the infrared laser light source 215 share the same semiconductor laser light source 213L that emits infrared rays, thereby allowing reduction in the number of components and costs. Further, examples of the respective light sources 211, 212, and 213 include a solid-state laser, a liquid laser, a gas laser, and a light-emitting diode.

The structure, however, is not limited to the above. A beam, in which the infrared rays and the green laser are synthesized, may be emitted from the green laser light source 213 by converting only a part of the infrared rays emitted from the semiconductor laser light source 213L into green light using the SHG element 213S. Further, a unique semiconductor laser light source may also be adopted for the infrared laser light source 215.

Note that each of the laser light sources 211, 212, and 213 in FIG. 2 is equipped with a function to modulate laser beams; however, for modulating the laser beams, a unit which modulates beams emitted from one of the laser light sources 211, 212, and 213 may also be used in combination with each corresponding one of the laser light sources 211, 212, and 213.

The red laser light source 211, the blue laser light source 212, and the green laser light source 213 represent colors, chrominance, and luminance of pixels to be displayed on the retina by properly modulating the intensities of the beams respectively emitted from the red laser light source 211, the blue laser light source 212, and the green laser light source 213. In addition to the modulation control, correction control may be performed in which influence of an optical system from the light source 101 to a user's eye is taking into account. The optical system includes the scan unit 103 and the transmissive deflection unit 104. For example, since the beam projected by the scan unit 103 enters obliquely to the transmissive deflection unit 104, the rectangle shape of the display area becomes distorted into a non-rectangle shape, such as trapezium. The output control of the laser may be performed in combination with the scan unit 103, so that the display area becomes a rectangular shape on which an inverse correction has been performed in advance.

In addition, the light source 101 in Embodiment 1 includes a light detecting unit 214 as shown in FIG. 2. The light detecting unit 214 in Embodiment 1 detects the intensity of the reflected light, on the transmissive deflection unit 104, of the beam projected for scanning by the scan unit 103. The light detecting unit 214 may be a semiconductor imaging element such as a charge coupled device (CCD), or may also be a photodetection element such as a photomultiplier and a photodiode.

The wavefront shape changing unit 102 controls, within a predetermined range, the spot size of the beams deflected by the transmissive deflection unit 104 that are to be described below, by changing the wavefront shapes of the beams emitted from the light source 101. A "spot size" of a beam, which is hereinafter described as a spot size on the retina of the user's eye, may be a spot size on the pupil or cornea, or a spot size on the transmissive deflection unit 104. The spot size on the retina is the same as the size of a pixel to be displayed.

The "wavefront shape" is a three-dimensional shape of a beam wavefront, and may be a flat surface, spherical surface, or non-spherical surface.

As shown in FIG. 2, the wavefront shape changing unit 102 includes a focal-length horizontal component changing unit 201 and a focal-length vertical component changing unit 202 arranged in series on an optical path. Therefore, the wavefront shape changing unit 102 can change curvature radiuses of the wavefront shape in the horizontal direction and the vertical direction separately.

The focal-length horizontal component changing unit 201 changes curvature radiuses in the horizontal direction by changing the distance between a cylindrical lens and a mirror. The focal-length vertical component changing unit 202 changes curvature radiuses in the vertical direction by using a cylindrical lens disposed perpendicular to the cylindrical lens of the focal length horizontal component changing unit 201. In addition, both the focal length horizontal component changing unit 201 and the focal length vertical component changing unit 202 change a beam diameter along with changing of the curvature.

Note that it is possible to respond to the horizontal change more largely by changing the horizontal curvature more largely than the vertical curvature. This is particularly effective in the case where the horizontal view angle of the screen is intended to be made larger than the vertical view angle, or where the horizontal incident angle of the beam that is incident on the transmissive deflection unit 104 (to be described later) from the scan unit 103 is larger than the vertical incident angle, as in the case of having the scan unit 103 on the lateral side of the head.

Note that in FIG. 2, of the items representing wavefront shapes, only part of the wavefront shapes, that is, the horizontal curvature, vertical curvature, and the respective diameters thereof are changed; however, it is also applicable to provide a unit which changes, as other items, the distribution of curvatures within the wavefront, or the shape or the size of the wavefront edge. This provides an advantageous effect of correcting aberration of the beams reaching the retina and changing the beam shape.

In addition, the wavefront shape changing unit 102 in FIG. 2 changes the wavefront shape using a cylindrical lens and a mirror; however, a variable shape lens such as a liquid crystal lens and a liquid lens, a diffraction element, or an electro-optic element (EO element) may also be used. With this, it is possible to reduce the movable parts in the apparatus as a whole, and also to reduce the movable range. As a result, reliability of the apparatus can be improved.

The scan unit 103 performs two-dimensional scanning on the transmissive deflection unit 104, using beams outputted from the wavefront shape changing unit 102. The scan unit 103 is a single-plate small mirror which can change angles two-dimensionally, and more specifically is a micro-electronic-mechanical-system (MEMS) mirror.

Note that the scan unit 103 may be implemented as a combination of two or more types of scan units, such as a combination of a horizontal scan unit and a vertical scan unit. By having the horizontal scan unit and the vertical scan unit separately, such advantageous effects can be obtained where they are not easily influenced by the oscillation of the other scan unit, and the mechanism can be simplified.

In addition, the use of the scan unit 103 is not limited to a method in which a mirror is physically tilted. The scan unit 103 may also be applied in a method in which lenses are moved or diffraction elements are rotated, and a method in which variable shape lenses such as liquid lenses, or diffraction elements such as acoustooptic (AO) elements and electro-optic conversion (EO) elements are used.

Further, scanning with visible light and scanning with infrared rays may be performed by the single scan unit 103. Further, the scanning with the visible light and the scanning with the infrared rays can be performed by separate scan units.

The transmissive deflection unit 104 is a part onto which the beam is projected for scanning by the scan unit 103. The transmissive deflection unit 104 includes transmissive characteristics for transmitting visible light traveling from the external world (the upper side of FIG. 1A) to the eye of the user, deflection characteristics for deflecting visible light projected for scanning by the scan unit 103 toward the pupil of the user's eye, and infrared absorption characteristics for absorbing projected infrared rays.

Hereinafter, in the present embodiment, the description is given of the case where the whole surface of the transmissive deflection unit 104 includes the transmissive characteristics, the deflection characteristics and the infrared absorption characteristics; however, it may be that only a part of the transmissive deflection unit 104 includes the transmissive characteristics, the deflection characteristics and the infrared absorption characteristics.

As shown in FIG. 3, the transmissive deflection unit 104 is disposed on the inner side of the lens 11 (the side facing the user's eye) in such a manner that a visible light deflection layer 104a, a heat insulation layer 104b and an infrared absorption layer 104c are laminated. More specifically, the infrared absorption layer 104c is positioned on the surface side facing the user's eye (hereinafter, referred to as a "first surface"), the visible light deflection layer 104a is positioned on the rear surface side of the first surface (hereinafter referred to as a "second surface"), and the heat insulation layer 104b is positioned between the visible light deflection layer 104a and the infrared absorption layer 104c.

The visible light deflection layer 104a transmits visible light traveling from the second surface side to the first surface side, and also deflects the visible light emitted form the light source 101 toward the user's eye. More specifically, the visible light deflection layer 104a is designed so as to diffract the beams projected by the scan unit 103, toward the user's eye, by forming, for example, a photopolymer layer on the internal surface of the goggle lens 11 and then forming a Lippmann volumetric hologram on the photopolymer layer.

On the photopolymer layer, three holograms may be multiply-formed which reflect lights emitted from the red, green, and blue light sources 211, 212 and 213, or a trilayer hologram corresponding to lights of the respective colors may also be laminated. In addition, it is possible to provide a transmissive display by manufacturing such that: only the lights having the wavelength of the light source is diffracted by using the wavelength selectivity of holograms, and the lights accounting for the major part of the light from the external world and having wavelengths other than the wavelength of the light source are not diffracted. Further, it is also possible to reduce the amount of infrared rays entering the eye, which provides an advantageous effect of reducing the influences of the infrared rays on the eye. Further, deflecting the beams by the diffraction of the hologram makes it possible to make the transmissive deflection unit 104 thinner.

The infrared absorption layer 104c transmits the visible light bidirectionally (from the first surface side toward the second surface side, and from the second surface side toward the first surface side), and also includes light absorption characteristics (infrared absorption characteristics) for absorbing infrared rays included in the scanning light projected by the scan unit 103. The part having the light absorption characteristics may be a polycarbonate resin or equivalent resin which includes transparency and selectively absorbs infrared rays, as shown in Japanese Unexamined Patent Publication Application No. 2000-143842.

The heat insulation layer 104b transmits the visible light bidirectionally (from the first surface side toward the second surface side, and from the second surface side toward the first surface side), and also blocks heat propagation between the visible light deflection layer 104a and the infrared absorption layer 104c. More specifically, the heat insulation layer 104b may be a transparent resin such as a polycarbonate and polyethylene terephthalate. By having the heat insulation layer 104b, the temperature change of the visible light deflection layer 104a can be reduced even when the temperature of the infrared absorption layer 104c rises. As a result, such an advantageous effect can be obtained where the characteristic change of the visible light deflection layer 104a, such as decrease or degradation of the deflection factor, due to the temperature change can be reduced. Further, the temperature of the infrared absorption layer 104a can be efficiently increased; and thus, prevention and reduction of condensation is possible with less laser output.

The control unit 105 includes an integrated circuit that controls each unit of the HMD. As shown in FIG. 4, the control unit 105 may include a central processing unit 501, a memory unit 502, an input and output control unit 503, and a communication unit 520. The memory unit 502 stores data used by the control unit 105.

The input and output control unit 503 controls outputs of control signals to units as control targets and inputs of signals from the units. The units include the light source 101, the wavefront shape changing unit 102, the scan unit 103, the transmissive deflection unit 104, the headphone unit 106, an electric power supply (not shown), and the communication unit 520. The input and output control unit 503 may include, for each kind of objects to be controlled, a light source input and output control unit 510, a wavefront-shape-change information input and output control unit 511, a scanning information input and output control unit 512, a deflection information input and output control unit 513, a headphone information input and output control unit 514, an electric power supply information input and output control unit 515, and a communication information input and output control unit 516. The input and output control unit 503 causes execution of input and output processing, which provides an advantageous effect of lowering the processing load on the central processing unit 501. The central processing unit 501 executes information processing by exchanging signals with the memory unit 502 and the input and output control unit 503.

Note that the control unit 105 may include the communication unit 520 which receives video and audio signals when a wireless connection is established with peripheral apparatuses such as a mobile phone. The wireless connection between the HMD and a peripheral apparatus provides an advantageous effect of improving wearability when the HMD is mounted.

The headphone unit 106 includes a speaker which outputs audio.

The headphone unit 106 may include a battery for supplying electric power to the respective units of the display apparatus.

The control unit 105 may control the light source 101 so as to change the output intensity of the infrared rays to be emitted, according to the position on the first surface of the transmissive reflection unit 104 onto which the beam is projected for scanning by the scan unit 103. With this, the infrared rays can be concentrated only on a necessary area; therefore, such advantageous effects can be obtained where energy consumption efficiency of the infrared rays is enhanced, and temperature rise of the light source 101 is suppressed, allowing extension of the life of the light source 101.

Figure 5A:
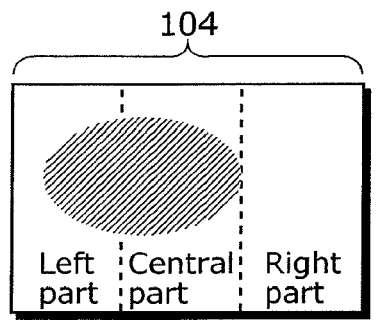
FIG. 5A is a diagram showing an example of fogging caused on the transmissive deflection unit.
Figure 5B:
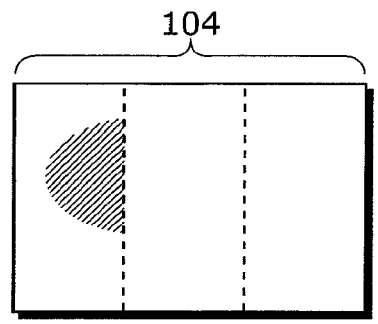
FIG. 5B is a diagram showing a state where the fogging on the central part has been removed from the state of FIG. 5A.

For example, the control unit 105 may cause the light source 101 to increase the output intensity of the infrared rays as the position of the beam projected for scanning by the scan unit 103 becomes closer to the central part of the first surface of the transmissive deflection unit 104. Here, the "central part of the transmissive deflection unit 104" refers to the central part of the case where the transmissive deflection unit 104 is divided into three directionally from left to right defining each as left part, central part and right part, as shown in FIG. 5A. It may also be the central part of the case where the transmissive deflection unit 104 is similarly divided into three directionally from up to down. Further, it may be the central part of the case where the transmissive deflection unit 104 is divided into three directionally both from left to right and from up to down, respectively.

This provides an advantageous effect of preferentially reducing the fogging on the central part, of the transmissive deflection unit 104, where the line-of-sight is concentrated most. For example, in order to remove the fogging on the central part in FIG. 5A, output of the infrared rays may be increased only when the infrared rays are being projected by the scan unit 103 onto the central part of the transmissive deflection unit 104. By performing scanning using the infrared rays onto the central part only, or preferentially onto the central part, it is possible to remove the fogging on the central part preferentially.

Note that "the output onto the central part is higher than the output onto the parts other than the central part" may be the case where the average output onto the central part is higher than the average output onto the parts other than the central part, or the case where the output onto a part of the central part is higher than the output onto a part of the parts other than the central part.

Further, the control unit 105 may determine the level of fogging on the transmissive deflection unit 104 based on the detection result of the light detecting unit 214, and control the light source 101 so as to change the output intensity of the infrared rays according to the determination result.

The light detecting unit 214 detects the intensity of the reflected light, on the transmissive deflection unit 104, of the beam projected for scanning by the scan unit 103. Condensation on the surface of the transmissive deflection unit 104 causes the beams be scattered, which results in the decrease in the intensity of the reflected light detected by the light detecting unit 214. In addition, the part of the transmissive deflection unit 104 that the beam is being projected onto can be specified based on information such as the angle of the scan unit 103.

Figure 5C:
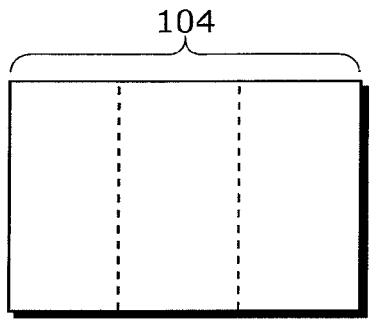
FIG. 5C is a diagram showing a state where the fogging on the left and central parts have been removed from the state of FIG. 5A.

For example, the control unit 105 determines the area in which the intensity of the reflected light is equal to or less than a threshold as a "fogging area", and causes the light source 101 to increase the output intensity of the infrared rays to be projected for scanning onto the fogging area. This provides an advantageous effect of reducing the fogging efficiently even when the level of the fogging or presence of the fogging differs depending on the area of the transmissive deflection unit 104. In addition, it is also possible to obtain such an advantageous effect where the temperature rise of the light source 101 can be suppressed which allows extension of the life of the light source 101. For example, in FIG. 5A, it can be presumed based on the detection result of the light detecting unit 214 that fogging is occurring on the left and central parts of the transmissive deflection unit 104, and not occurring on the right part. Hence, as shown in FIG. 5C, it is possible to reduce the fogging on the left and central parts by selectively increasing the output intensity of the infrared rays projected onto the left part and the central part.

Note that the above case is established when the "diffusion rate", which is one of the characteristics of the transmissive deflection unit 104, is high. On the other hand, when the diffusion rate of the transmissive deflection unit 104 is lower than a predetermined threshold, the tendency opposite to the above occurs. In other words, when the level of fogging on the transmissive deflection unit 104 becomes higher, the intensity of the reflected light detected by the light detecting unit 214 becomes lower. Thus, it is necessary to change the determining conditions in the control unit 105 according to the characteristics of the transmissive deflection unit 104. Furthermore, it is also known that when the level of the fogging becomes equal to or greater than the predetermined value, the above tendency (the correlation between the level of fogging and the intensity of the reflected light) becomes inverse.

As a variation, the light detecting unit 214 may be a line-of-sight detecting unit which detects the intensity of a reflected light from the user's eye and detects the line-of-sight direction of the user based on the detected intensity of the reflected light. The intensity of the reflected light from the user's cornea changes depending on the incidence angle on the surface of the cornea. More specifically, the reflectance of a beam entering vertically on the surface of the cornea is relatively high, and the reflectance of a beam entering obliquely on the surface of the cornea is relatively low. Hence, the line-of-sight detecting unit can determine the line-of-sight direction of the user based on the intensity of the reflected light from the user's cornea.

The control unit 105 may control the light source 101 so as to change the output intensity of the infrared rays, according to the line-of-sight direction of the user. More particularly, the control unit 105 causes the light source 101 to increase the output intensity of the infrared rays as the position onto which the beam is projected for scanning by the scan unit 103 becomes closer to the position where the user's line-of-sight and the first surface intersect with each other.

Figure 5D:
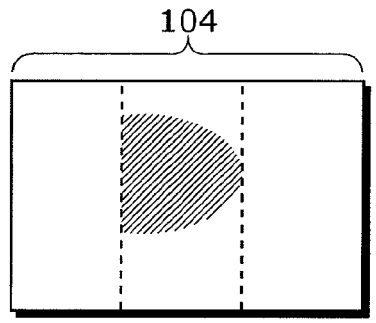
FIG. 5D is a diagram showing a state where the fogging on the left part has been removed from the state of FIG. 5A.

This provides an advantageous effect of preferentially reducing the fogging on the area where the user is gazing at. In addition, it is also possible to obtain such an advantageous effect where the temperature rise of the light source 101 can be suppressed, which allows extension of the life of the light source 101. For example, in FIG. 5A, when it can be presumed that the point of gaze of the user is on the left part, it is possible to preferentially reduce the fogging on the left part as shown in FIG. 5D.

Further, as another variation, the open or closed state of the user's eyelid may be determined based on the reflected light from the user's eye which is detected by the light detecting unit 214. Eyelids have a lower reflectance of beams than retinas. Furthermore, since the eyelid gradually closes from the top of the eyeball toward the bottom, and opens from the bottom toward the top, the open or closed state of the eyelid can be determined based on the intensity detection of the reflected light and its change over time. Based on the determination result, in the case of the state where the eye is closed (the state where the user is not looking at anything), the output intensity of the infrared rays may be decreased.

Note that the method for detecting a line-of-sight direction may be a method using a reflected light of a beam projected for scanning by the scan unit 103, or a method using a reflected light of a beam emitted from a light source other than the scan unit 103. For example, in Japanese Patent No. 2995876, the line-of-sight detection is performed by detecting, with an image sensor, the infrared rays emitted from an infrared light-emitting diode and reflected on the eye. Further, in Japanese Patent No. 3425818, the line-of-sight detection is performed by detecting, with an image sensor, a reflected light, on the eye, of the beam projected for scanning by the scan unit 103.

Further, the intensity of detection when a reflected light is detected may be represented as a ratio between the intensity of the emitted light modulated by the light source 101 and the intensity of the reflected light detected by the light detecting unit 214. This provides an advantageous effect of reducing influences of the intensity change of the emitted light according to the change of the displayed image. Further, it may be that while scanning is performed, at a constant intensity, using light such as infrared rays which are not perceived by the eye, and the reflected light is detected. This makes it possible to provide an advantageous effect of detecting the reflected light independently from lightness or color change of the displayed image.

As described, by the transmissive deflection unit 104 having the beam absorption characteristics for absorbing infrared rays, the transmissive deflection unit 104 absorbs the infrared rays included in the scanning light projected by the scan unit 103, and the energy of the absorbed infrared rays can reduce, remove, and prevent condensation that occurs on the surface of the transmissive deflection unit 104.

Note that the infrared absorption layer 104c may include the beam absorption characteristics for making the infrared absorptance higher than the visible light absorptance. As a result, it is possible to remove fogging by using infrared rays, and also improve the luminance of the display at the same time. Further, it is also possible to obtain such advantageous effects where the amount of infrared rays entering the eyes can be reduced, and the degradation of the luminance of the display can be reduced.

Further, the focal position of the infrared rays emitted from the light source 101 may be the position different from the eye of the user such as the retina and the crystalline body. As a result, the infrared rays are not focused on the user's eye; therefore, the influences of the infrared rays on the eye can be reduced even when a part of the infrared rays enters the user's eye. In addition, it is possible to increase the amount of infrared rays projected onto the transmissive deflection unit 104 without increasing the influences on the eye; and thus condensation can be further reduced.

Note that as a method for controlling the focal position of the infrared rays, the infrared laser light source 215 may perform a modulation control that is different from the modulation control in the respective laser light sources 211, 212, and 213 (dynamic control). Alternatively, it may be that the modulation control is performed by the respective laser light sources 211, 212, and 213 in synchronization with the infrared laser light source 215, and providing further, for example, a lens on the infrared laser light source 215 so that the wavefront shape of the infrared rays to be emitted is always different from that of the visible light (static control).

Further, the scan unit 103 and the transmissive deflection unit 104 may be positioned such that the infrared rays specularly reflected on the transmissive deflection unit 104 do not enter the user's eye. This makes it possible to reduce the amount of infrared rays entering the user's eye even when the specular reflectance of the beam on the transmissive deflection unit 104 is high, thereby allowing the reduction of the influences of the infrared rays on the eye. In addition, it is possible to increase the amount of infrared rays projected onto the transmissive deflection unit 104 without increasing the influences on the eye; and thus condensation can be further reduced.

Furthermore, the infrared absorption layer 104c may include such beam absorption characteristics that the infrared absorptance varies depending on the part of the transmissive deflection unit 104 (position on the first surface). As a result, such advantageous effects can be obtained where unnecessary removal of fogging can be reduced, and cost can be reduced by decreasing the area of the beam absorption characteristic part.

For example, the infrared absorption layer 104c may be made so as to have a higher infrared absorptance, the closer it is to the central part of the transmissive deflection unit 104. More particularly, the thickness of the infrared absorption layer 104c is made to be thicker, the closer it is to the central part of the transmissive deflection unit 104. Here, the central part of the transmissive deflection unit 104 refers to the central part of the case where the transmissive deflection unit 104 is divided into three directionally from left to right defining each as left part, central part and right part, as shown in FIG. 5A. It may also be the central part of the case where the transmissive deflection unit 104 is similarly divided into three directionally from up to down. Further, it may be the central part of the case where the transmissive direction unit 104 is divided into three directionally both from left to right and from up to down, respectively.

By the central part having an infrared absorptance higher than the parts other than the central part, it is possible to obtain an advantageous effect of preferentially reducing the fogging on the central part, of the transmissive deflection unit 104, where the line-of-sight is concentrated most. Note that "the infrared absorptance of the central part is higher than the parts other than the central part" may be the case where the average absorptance of the central part is higher than that of the parts other than the central part, or the case where the absorptance of a part of the central part is higher than that of a part of the parts other than the central part.

In addition, the display apparatus according to the present invention can obtain electric power for driving units, such as the light source 101, the wavefront shape changing unit 102, the scan unit 103, the control unit 105 and the headphone unit 106, from an external electric power supply (AC power source), or can also obtain from a battery included in the display apparatus.

The electric power information input and output control unit 515 (electric power supply mode switching unit) sets a first electric power supply mode for supplying electric power from an external power source to each unit when the display apparatus is connected to the external power source. On the other hand, when the display apparatus is not connected to the external power source, the electric power information input and output control unit 515 sets a second electric power supply mode for supplying electric power from a battery to each unit. Then, the control unit 105 causes the light source 101 to decrease the output intensity of the infrared rays in response to the switching into the second electric power supply mode by the electric power information input and output control unit 515. This makes it possible to strongly reduce fogging in the case where there are plenty of electric power (first electric power supply mode), and perform appropriate reduction of the fogging even in the case where there is not enough surplus electric power (second electric supply mode).

As an example of the display apparatus, the description is given of the case of the goggle-type HMD; however, the HMD may be other than the goggle-type. Examples of the HMD include a monocular HMD and a helmet-type HMD. Further, the display apparatus may be for conveyances such as a vehicle, motorbike, train, airplane, helicopter, and ship.

Note that each unit in FIG. 1A through FIG. 4 may be included in a single case, or in several cases. For example, the light sources 101 and 110 may be included in separate cases other than the scan units 103 and 108, or the headphone units 106 and 112 need not to be included. Further, each unit may be arranged dispersedly. For example, some parts of the control units 105 and 111 may be included in the light sources 101 and 110, or scan units 103 and 108. In addition, each unit may be plural. For example, two scan units may be included for each of the left eye and the right eye. Further, each unit may be shared by plural apparatuses. For example, the light sources 101 and 110 may be shared by two display apparatuses.

As described, in the display apparatus according to the present invention, the transmissive deflection units 104 and 107 include beam absorption characteristics for absorbing beams projected by the scan units 103 and 108. As a result, it is possible for the display apparatus such as a HMD and HUD to reduce, remove, and prevent fogging that occurs on the transmissive deflection units 104 and 107 in front of the eyes, while suppressing the increase in the volume, weight and component cost of the apparatus as a whole.

Embodiment 2

Figure 6:
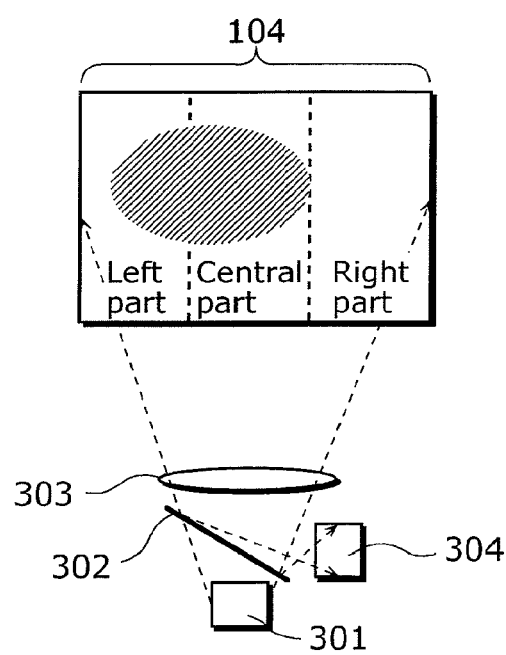
FIG. 6 is a structural diagram of a display apparatus in Embodiment 2 according to the present invention.

FIG. 6 is a structural diagram of a display apparatus in Embodiment 2 according to the present invention. The display apparatus in Embodiment 2 includes a display element 301, a beam splitter 302, a projection lens 303, an imaging element 304, and a transmissive deflection unit 104.

In the display element 301, a plurality of light sources each corresponding to respective pixels are arranged two-dimensionally (arranged in a matrix state). Further, the light sources respectively emit red light, green light, blue light and infrared rays. Examples of the display element 301 include a liquid crystal display apparatus.

The beam splitter 302 controls the output intensity of the beams emitted from the display element 301 for each pixel (light source). The projection lens 303 projects, onto the transmissive deflection unit 104, the beam emitted from the display element 301 and passed through the beam splitter 302.

The beam, projected onto the transmissive deflection unit 104 from the display element 301 via the beam splitter 302 and the projection lens 303, is reflected by the transmissive deflection unit 104 and enters the imaging element 304 via the projection lens 303 and the beam splitter 302. The imaging element 304 detects, for example, the level of fogging on the transmissive deflection unit 104 based on the incident light.

In Embodiment 1, the example has been described where the beams emitted from the light sources 101 and 110 are projected for scanning by the scan units 103 and 108 and projected onto the transmissive deflection units 104 and 107. In Embodiment 2, display light from the display element 301 that is a two-dimensional spatial modulation element such as liquid crystal, is projected onto the transmissive deflection unit 104 through the beam splitter 302, the projection lens 303 and the like. The reflected light from the transmissive deflection unit 104 follows the optical path again in a reverse direction, and is detected at the imaging element 304 after passing through the projection lens 303, the beam splitter 302 and the like.

With this, it is possible to detect the distribution of the fogging strength on the transmissive deflection unit 104. Then, projection of the infrared rays onto the part which is detected as a heavy fogging area allows preferential removal of a part of the fogging on the transmissive deflection unit 104. As a result, unnecessary removal of the fogging can be reduced, which provides an advantageous effect of reducing power consumption, and suppressing the temperature change of the transmissive deflection unit 104 as a whole.

Note that such a display imaging element may be used that includes functions of both the display element 301 and the imaging element 304. This provides an advantageous effect of reducing the number of components and simplifying the optical system.

Embodiment 3

Figure 7:
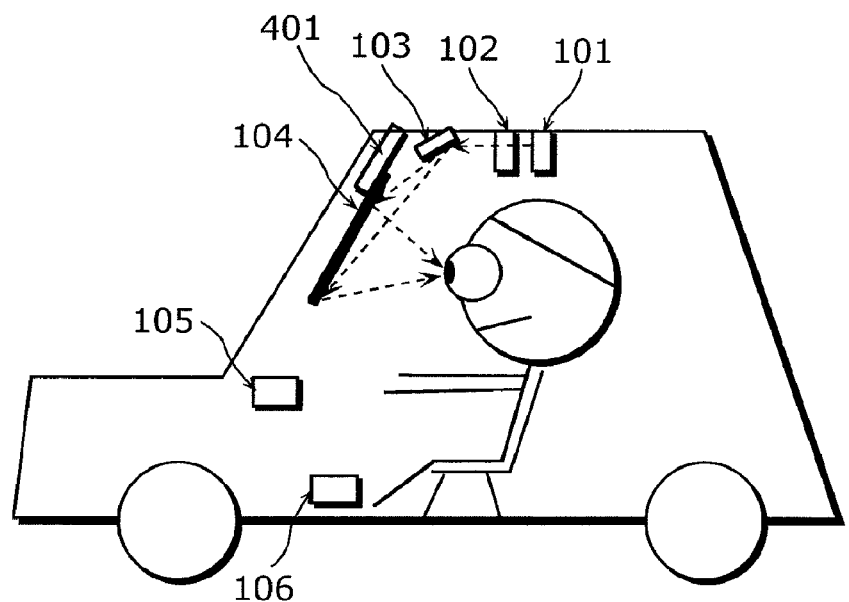
FIG. 7 is a diagram showing an example of a vehicle equipped with a display apparatus according to the present invention.

FIG. 7 is a structural diagram of a head-up display (HUD) for vehicles in Embodiment 3 according to the present invention.

The HUD includes a light source 101, a wavefront shape changing unit 102, a scan unit 103, a transmissive deflection unit 104, a control unit 105, and a headphone unit 106 which have the same basic structures as those in Embodiment 1, and thus operate similarly.

In Embodiment 3, a video is displayed to a user in a vehicle. More specifically, the light source 101, the wavefront shape changing unit 102, and the scan unit 103 are disposed on the ceiling, and the transmissive deflection unit 104 is disposed between the driver and the windshield. Note that the transmissive deflection unit 104 according to Embodiment 3 is hung from the ceiling in such a manner that the angle can be changed by a holding part 401.

As in Embodiment 1, the transmissive deflection unit 104 has characteristics for transmitting visible light from outside the vehicle, which allows the user to watch display according to the present invention while seeing landscape outside the vehicle. This provides an advantageous effect of allowing the user to watch information relating to driving actions and a current location such as a vehicle speed, a caution and alert, navigation guidance.

As shown in FIG. 7, the light source 101, the wavefront shape changing unit 102, and the scan unit 103 may be arranged at positions around the ceiling of the vehicle. This provides an advantageous effect of not shielding the user's visual field from outside the window. Further, since they are arranged at the positions close to the user's eyes, the optical path becomes shorter, which provides an advantageous effect of increasing display precision. In addition, the HUD may be structured such that the light source 101 is disposed at a position, such as a position below the vehicle body, which is distant from the wavefront shape changing unit 102, and beams are transmitted from the light source 101 to the wavefront shape changing unit 102 via an optical fiber. This provides an advantageous effect of decreasing the dimensions of an area, on the ceiling part, on which the light source 101 is disposed.

The control unit 105 may be disposed inside a dashboard of the vehicle. The control unit 105 may be integrated into a control apparatus which is not the display apparatus according to the present invention. For example, the control apparatus may be a vehicle speed management apparatus, or a guidance control apparatus (vehicle navigation system). This makes it possible to provide an advantageous effect of decreasing the total number of control apparatuses.

It is not necessary that the headphone unit 106 is in contact with an ear of the user, and the headphone unit 106 may be a speaker mounted on the inner surface of the vehicle around the user, for example, on the inside of a door or the front dashboard of the vehicle.

These structures provide, in the display apparatus such as a HUD, an advantageous effect of reducing, removing, and preventing fogging that occurs on the transmissive deflection unit 104 in front of the user's eye, while suppressing the increase in the volume, weight and component cost of the apparatus as a whole. Compared to a conventional method for preventing fogging by blowing air, the present invention does not rely on blowing air; therefore, it is possible to obtain such advantageous effects of reducing a problem of air blowback, where air blows back from the window glass to the face of a passenger, or a problem of dry skin or eyes of the passenger by the dry air being blown out.

Figure 8:
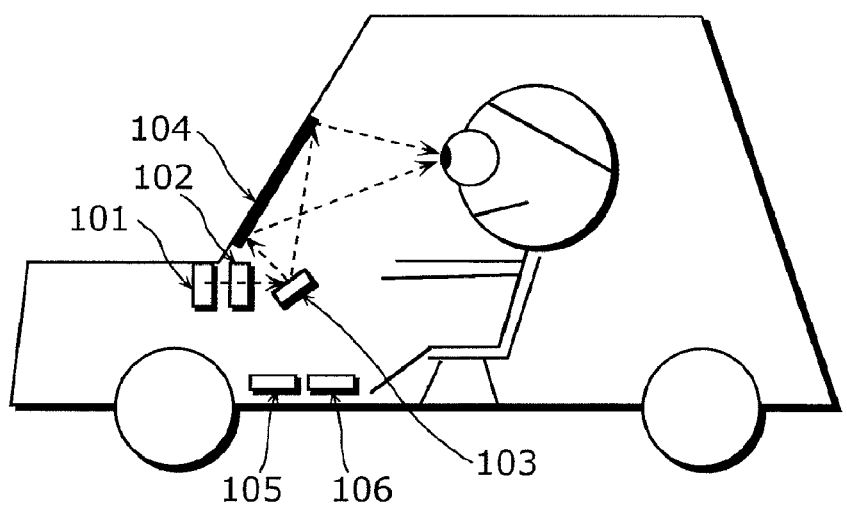
FIG. 8 is a diagram showing another example of a vehicle equipped with a display apparatus according to the present invention.

As an arrangement variation different from FIG. 7, the structure may be, as in FIG. 8, that the transmissive deflection unit 104 is integrated into the window glass (attached directly to the inner surface of the windshield) and beams are projected for scanning by the scan unit 103 arranged in a lower position. This allows the transmissive deflection unit 104 and the scan unit 103 to be integrated with the window glass or dashboard, which provides an advantageous effect that a vehicle can be equipped with the display apparatus according to the present invention without making major changes on the appearance of the inside the vehicle.

Embodiment 4

Figure 9:
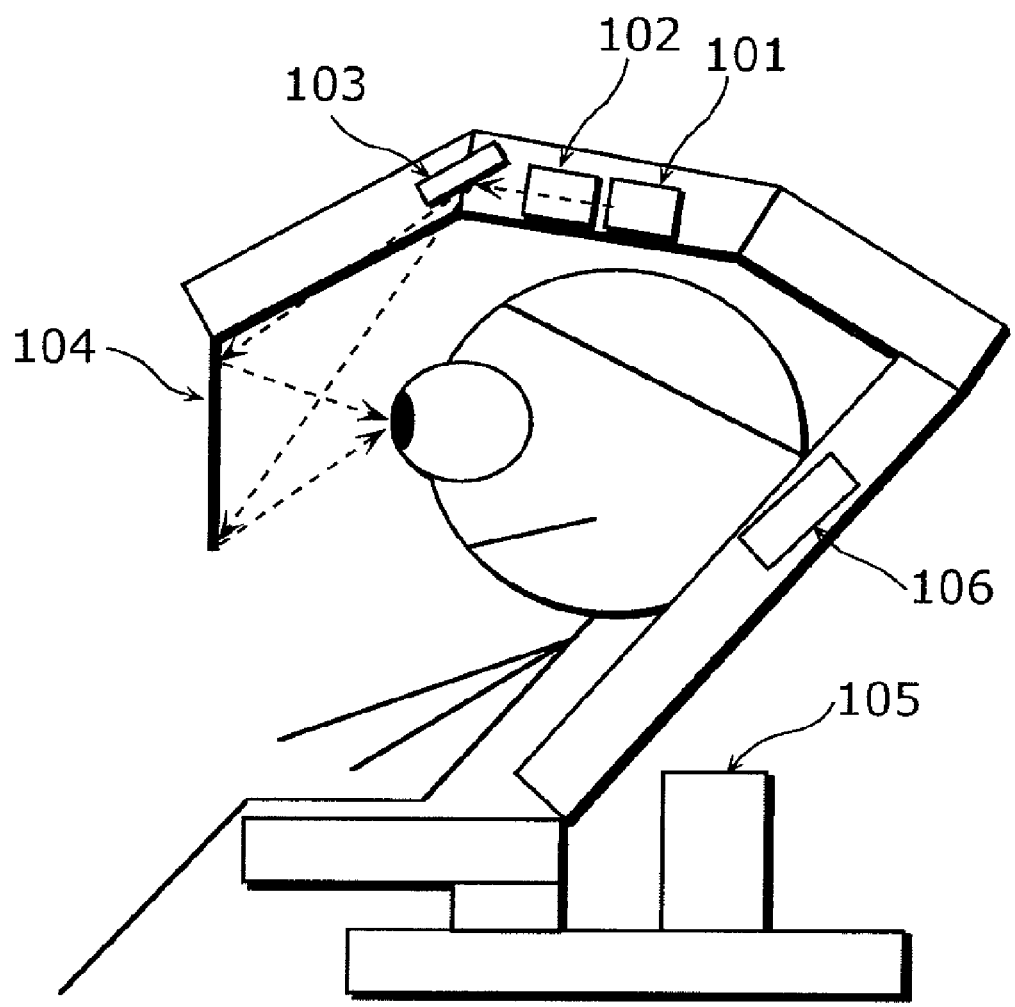
FIG. 9 is a diagram showing an example of a chair equipped with a display apparatus according to the present invention.

FIG. 9 is a structural diagram of a chair-type display apparatus in Embodiment 4 according to the present invention.

The display apparatus includes a light source 101, a wavefront shape changing unit 102, a scan unit 103, a transmissive deflection unit 104, a control unit 105, and a headphone unit 106 which have the same basic structures as those in Embodiment 1, and thus operate similarly.

In Embodiment 4, a video is displayed to a user sitting on a chair.

As shown in FIG. 9, the light source 101, the wavefront shape changing unit 102, and the scan unit 103 may be arranged at positions toward the transmissive deflection unit 104 in front of the eyes of the user from the chair back. In FIG. 9, those units are arranged above the user's head, but they may be arranged near the lateral side of the user's head or below the head.

The control unit 105 may be disposed below the chair. The control unit 105 may be integrated into a control apparatus which is not the display apparatus according to the present invention. For example, the control apparatus may be a massage control apparatus. This makes it possible to provide an advantageous effect of decreasing the total number of control apparatuses.

The headphone unit 106 may be a headphone in contact with an ear of the user, or a speaker arranged at a position near a back or side of the user's head.

Such structures provide, in the display apparatus mounted on the chair such as a massage chair, an advantageous effect of reducing, removing or preventing fogging that occurs on the transmissive deflection unit 104 in front of the user's eyes without addition of an apparatus dedicated for preventing and removing fogging such as a heater and a blower, while suppressing the increase in the volume, weight and component cost of the apparatus as a whole.

Furthermore, the present invention can be implemented not only as a display apparatus, but also as a program causing a computer to execute a display method. Further, the display apparatus according to the embodiments may be implemented by using an LSI which is a typical integrated circuit. In this case, the LSI may be integrated into one chip, or may be integrated into plural chips. For example, the functional blocks other than a memory may be integrated into one chip LSI. Here, it is called LSI, but it may also be called IC, system LSI, super LSI, or ultra LSI depending on the degree of integration.

Moreover, ways to achieve an integrated circuit are not limited to the use of the LSI. A special circuit or a general purpose processor and so forth may also be used for achieving the integration. A field programmable gate array (FPGA) that can be programmed or a reconfigurable processor that allows re-configuration of the connection or configuration of LSI may be used after LSI is manufactured.

Further, when a technology for the integrated circuit replacing LSI is developed with the advance of semiconductor technology or relevant technology, functional blocks can be integrated using the technology. Possible field of technology to be applicable include, for example, biotechnology.

In addition, the embodiments described above are only examples. Of course, many modifications are possible in the exemplary embodiments without materially departing from the novel teachings and advantages of this invention.

INDUSTRIAL APPLICABILITY

The display apparatus according to the present invention can reduce, remove and prevent fogging on the transmissive deflection unit, and can be applied to a display system, a display method and the like.

What is claimed is:

1. A display apparatus which displays an image on a retina of a user, said display apparatus comprising:
   a light source which emits a beam including a visible light forming the image and an infrared ray;
   a transmissive deflection unit which includes a first surface facing an eye of the user, and a second surface that is a rear surface of said first surface; and
   a light detecting unit configured to detect an intensity of reflected light of the beam emitted by said light source which is reflected by said transmissive deflection unit,
   wherein said transmissive deflection unit includes:
      a transmissive characteristic for transmitting the visible light from a second surface side to a first surface side;
      a deflection characteristic for deflecting, toward the eye of the user, the visible light projected from said light source to the first surface side; and
      an infrared absorption characteristic for absorbing the infrared ray projected from said light source to the first surface side,
   wherein said light source emits the infrared ray onto a fogging area of said transmissive deflection unit with a first output intensity, and emits the infrared ray onto an area of said transmissive deflection unit other than the fogging area with a second output intensity, the first output intensity being higher than the second output intensity, and
   wherein the fogging area on said transmissive deflection unit is determined based on the intensity of the reflected light detected by said light detecting unit.

2. The display apparatus according to claim 1, further comprising:
   a scan unit configured to perform two-dimensional scanning on said first surface of said transmissive deflection unit, using the beam emitted from said light source; and
   a control unit configured to cause said light source to change an output intensity of the infrared ray according to a position on said first surface onto which the beam is projected for scanning by said scan unit.

3. The display apparatus according to claim 2,
   wherein said scan unit and said transmissive deflection unit are positioned such that the infrared ray specularly reflected by said transmissive deflection unit is projected onto a position that is different from a position of the eye of the user.

4. The display apparatus according to claim 2, further comprising
   a line-of-sight detecting unit configured to detect a line-of-sight of the user based on a reflected light, on the eye of the user, of the visible beam deflected by said transmissive deflection unit,
   wherein said control unit is configured to cause said light source to increase the output intensity of the infrared ray as a position onto which the beam is projected for scanning by said scan unit becomes closer to a position where the line-of-sight of the user detected by said line-of-sight detecting unit and said first surface intersect with each other.

5. The display apparatus according to claim 1,
   wherein said transmissive deflection unit includes:
      an infrared absorption layer which is disposed on the first surface side, transmits the visible light, and absorbs the infrared ray emitted from said light source;
      a visible light deflection layer which is disposed on the second surface side, transmits the visible light traveling from the second surface side to the first surface side, and deflects, toward the eye of the user, the visible light emitted from said light source; and
      a heat insulation layer which is disposed between said infrared absorption layer and said visible light deflection layer, transmits the visible light, and blocks heat propagation between said infrared absorption layer and said visible light deflection layer.

6. The display apparatus according to claim 5, wherein said infrared absorption layer has a different infrared absorptance according to a position on said first surface.

7. The display apparatus according to claim 6, wherein said infrared absorption layer has a higher infrared absorptance as a position on said first surface becomes closer to the central part of said first surface.

8. The display apparatus according to claim 1, further comprising:
an electric power supply mode switching unit configured to switch between a first electric power supply mode in which an electric power from an external power source is supplied to said light source, and a second electric power supply mode in which an electric power from a battery included in said display apparatus is supplied to said light source; and
a control unit configured to cause said light source to decrease the output intensity of the infrared ray in response to the switching into the second electric power supply mode by said electric power supply mode switching unit.

9. The display apparatus according to claim 1, further comprising
a control unit configured to make a wavefront shape of the infrared ray emitted from said light source different from a wavefront shape of the visible light, so that a focal position of the infrared ray that is deflected by said transmissive deflection unit toward the eye of the user is a position that is out of the eye of the user.

10. A goggle-type head-mounted display comprising:
the display apparatus according to claim 1;
a pair of lenses provided in front of the eyes of the user and each having said transmissive deflection unit on a side facing the eyes of the user; and
a pair of temples each having one end connected to corresponding one of said pair of lenses and the other end fixed to a lateral side of a head of the user.

11. A vehicle comprising:
the display apparatus according to claim 1; and
a windshield having said transmissive deflection unit.

12. The display apparatus according to claim 1, wherein the fogging area on said transmissive deflection unit corresponds to an area on said transmissive deflection unit in which the intensity of the reflected light detected by said light detecting unit is equal to or less than a predetermined threshold.

13. A display method for displaying an image on a retina of a user via a transmissive deflection unit,
wherein the transmissive deflection unit includes:
a first surface facing an eye of the user, and a second surface that is a rear surface of the first surface;
a transmissive characteristic for transmitting a visible light from a second surface side to a first surface side;
a deflection characteristic for deflecting, toward the eye of the user, the visible light projected from a light source to the first surface side; and
an infrared absorption characteristic for absorbing an infrared ray projected from the light source to the first surface side, said display method comprising:
emitting a beam including the visible light forming the image and the infrared ray;
performing two-dimensional scanning on the first surface of the transmissive deflection unit, using the beam emitted in the emitting; and
detecting an intensity of reflected light of the beam emitted by the light source which is reflected by the transmissive deflection unit,
wherein in said emitting, the infrared ray is emitted onto a fogging area of the transmissive deflection unit with a first output intensity, and the infrared ray is emitted onto an area of the transmissive deflection unit other than the fogging area with a second output intensity, the first output intensity being higher than the second output intensity, and
wherein the fogging area on the transmissive deflection unit is determined based on the intensity of the reflected light detected in said detecting.

14. The display method according to claim 13, wherein the fogging area on the transmissive deflection unit corresponds to an area on the transmissive deflection unit in which the intensity of the reflected light detected in said detecting is equal to or less than a predetermined threshold.

* * * * *